(12) United States Patent
Inose et al.

(10) Patent No.: US 6,446,772 B1
(45) Date of Patent: Sep. 10, 2002

(54) COUPLING

(75) Inventors: Hideyuki Inose; Nobushi Yamazaki, both of Tochigi (JP)

(73) Assignee: Tochigi Fuji Sangyo Kabushiki Kaisha, Tochigi (JP)

( * ) Notice: Subject to any disclaimer, the term of this patent is extended or adjusted under 35 U.S.C. 154(b) by 0 days.

(21) Appl. No.: 09/654,385

(22) Filed: Sep. 1, 2000

(30) Foreign Application Priority Data

Sep. 3, 1999 (JP) ............................................. 11-250440
Dec. 28, 1999 (JP) ............................................. 11-375840

(51) Int. Cl.[7] ............................................. F16D 27/115
(52) U.S. Cl. ........................ 192/35; 192/48.2; 192/84.7
(58) Field of Search ...................... 192/35, 48.2, 70.23, 192/70.24, 84.7, 99 A (56) References Cited

U.S. PATENT DOCUMENTS

| | | | |
|---|---|---|---|
| 1,594,937 A | | 8/1926 | Frey |
| 1,935,684 A | * | 11/1933 | Wemp .......................... 192/35 |
| 2,040,409 A | | 5/1936 | Russell |
| 2,072,832 A | | 3/1937 | Weydell |
| 2,649,941 A | * | 8/1953 | Doebeli ......................... 192/35 |
| 2,801,719 A | | 8/1957 | Clerk |
| 4,201,281 A | * | 5/1980 | MacDonald ................... 192/35 |
| 4,286,701 A | | 9/1981 | MacDonald |
| 5,107,972 A | * | 4/1992 | Sundquist ...................... 192/35 |
| 6,092,633 A | * | 7/2000 | Morisawa ...................... 192/35 |

FOREIGN PATENT DOCUMENTS

| | | |
|---|---|---|
| CH | 274 956 | 4/1951 |
| DE | 1 058 321 | 5/1959 |
| EP | 00 11 9005 | 12/2000 |
| GB | 324950 | 2/1930 |

OTHER PUBLICATIONS

"Gaia New Type Car Explanation" published May 29, 1998 by Toyota Automobile Co., Ltd., Service Department and its English abstract thereof.

* cited by examiner

*Primary Examiner*—Richard M. Lorence
(74) *Attorney, Agent, or Firm*—Morrison & Foerster LLP (57) ABSTRACT

There is provided with a first clutch. A second clutch is for controlling fastening and releasing operation of the first clutch. The first clutch and the second clutch are radially differently and axially correspondently positioned each other.

20 Claims, 5 Drawing Sheets

COUPLING

BACKGROUND OF THE INVENTION

1. Field of the Invention

The present invention relates to a coupling which is disposed in a torque-transmitting path and which is fastened by an electromagnetic control.

2. Description of Relevant Art

There has been disclosed a coupling in "Gaia new type car explanation (published on May 29, 1998 by Toyota automobile Co., Ltd. service department)".

SUMMARY OF THE INVENTION

In the above-mentioned coupling, a control clutch and a main clutch are arranged in series in a rotational axis direction, and the coupling is elongated in the axial direction.

An object of the invention is to provide a coupling in which a length in an axial direction is shortened.

From an aspect of the present invention, there is provided a coupling as follows. The coupling includes a first clutch, and a second clutch for controlling fastening and releasing operation of the first clutch. The first clutch and the second clutch are radially differently and axially correspondently positioned each other.

According to the invention, the coupling becomes small-sized in an axial direction, and a freedom on design is improved. Therefore, a coupling which needs a transmission torque capacity for an insufficient axial space, such as a start clutch for a vehicle disposed between a motor (an engine) and a transmission, obtains a preferable constitution.

The term of "first clutch" means a main clutch including a single plate clutch or a plurality of plates clutch. For example, the main clutch includes inner plates and outer plates, and a thrust washer. The term of "second clutch" means a pilot clutch including a single plate clutch or a plurality of plates clutch. For example, the pilot clutch includes including inner plates and outer plates, and an armature. The term of "controlling" includes not only an intermediate control of a clutch fastening force, or a transmission torque, but also a switching operation between fastening and releasing of a clutch. The phrase of "axially correspondently positioned" includes a meaning that an axial position of a part of the first clutch corresponds to an axial position of a part of the second clutch.

Preferably, the first clutch is disposed radially outward of the second clutch.

According to the invention, a torque capacity of a clutch is enlarged. As a result, for example, in multi-disc plates type clutch, it is possible to reduce the number of clutch plates for obtaining the same torque capacity, thus to further easily reduce an axial size of a coupling.

Preferably, the second clutch is to be magnetically operated.

According to the invention, it is carried out with a simple structure in comparison with that for operating a second clutch by an oil pressure system, and a transmission torque of a coupling is accurately controlled.

Preferably, the coupling further includes an electromagnet which is axially adjacent to the second clutch.

According to the invention, the second clutch is directly operated, and an operation response of a coupling is largely improved in comparison with, for example, a constitution for operating a second clutch through an intermediate member.

Preferably, the coupling further includes an amplifying mechanism for amplifying a transmitted torque and converting the transmitted torque to an operating force, the transmitted torque to be applied to the amplifying mechanism when fastening the second clutch.

According to the invention, the amplifying mechanism makes an operating force of the first clutch amplified, and a torque transmission capacity between the first clutch and the coupling are strengthened. The first clutch and the coupling becomes small-sized and light.

Preferably, the amplifying mechanism and the first clutch are radially correspondently positioned each other.

According to the invention, the amplifying mechanism and the first clutch are axially arranged each other, and the coupling becomes radially small-sized. The phrase of "radially correspondently positioned" includes a meaning that a radial position of a part of the amplifying mechanism corresponds to a radial position of a part of the first clutch.

Preferably, the amplifying mechanism and the second clutch are radially correspondently positioned each other.

According to the invention, the amplifying mechanism and the second clutch are axially arranged, and the coupling is radially small-sized.

Preferably, the amplifying mechanism includes a lever mechanism radially extending, the lever mechanism to be swung about a fulcrum in a middle part thereof.

According to the invention, to select a fulcrum position of the lever mechanism allows an amplifying rate of an operating force to be easily changed.

Preferably, the amplifying mechanism includes a lever mechanism fixed with a diaphragm-type spring at a radially outward end thereof for pressing the first clutch, the lever mechanism to be swung about a fulcrum in a middle part thereof.

According to the invention, for example, it is possible to adopt a constitution in which the diaphragm-type spring makes the first clutch mechanically pressed and fastened, and the amplifying mechanism is employed for releasing the first clutch, thus to set an operating force source small at the release. Therefore, it is remarkably advantageous to use for fastening the first clutch in most of operation time.

Preferably, the amplifying mechanism is disposed radially inward of the first clutch and the second clutch.

According to the invention, the amplifying mechanism is disposed at a position close to a rotational axis and radially inward of the first clutch and the second clutch, and a torque to be applied to the amplifying mechanism is enlarged. Therefore, a torque transmission capacity between the first clutch and the amplifying mechanism are further strengthened, and these sizes and weights are reduced.

A large torque is applied to the amplifying mechanism, and a response for generating an operating force of the first clutch is improved.

In a constitution employing the lever mechanism for an amplifying function, by disposing the amplifying mechanism at a position close to the rotational axis, a lever is lengthened for that, and an extent to be selected for a swing fulcrum is widened. Therefore, a torque transmission capacity between the first clutch and a coupling is further strengthened.

Preferably, the first clutch is disposed radially outward of the second clutch. The coupling further includes an operating member for transmitting an operating force amplified by the amplifying mechanism to the first clutch.

The operating member has a base part and an operating part for the first clutch formed at an outer end of the base part. The operating part axially opposes to the first clutch. The base part is connected with the amplifying mechanism and the operating part over the second clutch.

According to the invention, the coupling is further radially small-sized in comparison with a constitution in which an operating member is radially disposed.

Preferably, the coupling further includes an operating member for transmitting an operating force amplified by the amplifying mechanism to the first clutch. The amplifying mechanism is provided between the operating member and a first clutch side member.

According to the invention, an operating force of the first clutch is cancelled inside the first clutch, and the operating force is not applied to outer members around the first clutch, so that durability is largely improved.

For example, without a thrust bearing to be subjected to an operating force between the first clutch side member and an outer member to relatively rotate each other, they are not self-locked without, and the thrust bearing is not necessary. Thus, a cost is reduced for that, a constitution is small-sized, and a freedom on design is improved.

Preferably, the amplifying mechanism is a cam mechanism.

According to the invention, the cam mechanism is small-sized and generates a large operating force, so that a torque transmission capacity between the first clutch and a coupling is further strengthened without increment of an arrangement space.

Preferably, the coupling further includes a torque transmission member connected with the first clutch and the second clutch. The torque transmission member has a first and a second cylinder part. The first cylinder part is connected with the first clutch. The second cylinder part is connected with the second clutch.

According to the invention, the first clutch and the second clutch are connected to the first and second cylinder parts formed to the identical torque transmission member. Thus the number of constitution members is reduced and the coupling becomes small-sized and light in comparison with a constitution in which they each are connected to a different torque transmission member.

Especially, in the invention where the first clutch and the second clutch are radially arranged, the coupling is axially small-sized.

Preferably, the coupling further includes a torque transmission member connected with the first clutch and the second clutch. The torque transmission member has a cylinder part with a first and a second side. The first clutch is connected to the first side. The second clutch is connected to the second side.

According to the invention, the first clutch and the second clutch are connected respectively to the first side and the second side in a radial direction, and they are radially arranged.

The first clutch and the second clutch are connected to the identical cylinder part of the torque transmission member, and the torque transmission member becomes small-sized and light.

Preferably, the second clutch is a cone clutch.

According to the invention, the cone clutch with the small number of friction faces makes a pulling force small at release of fastening, in comparison with a multi-disc plates clutch with the large number of friction faces.

For example, in a coupling which employs a cone clutch for an automatic clutch of an automatic transmission vehicle, if it is structured to use under a wet environment with ATF (Automatic Transmission Oil) for lubrication and cooling, a pulling force is small, a noise level is remarkably small and a torque is substantially completely removed, so that smooth transmission is achieved.

A volume of a synchronous mechanism becomes small, and a cost for that is reduced.

As employing an oil pump for an automatic transmission, an exclusive oil pump for a coupling and a device for lubrication and cooling are omitted, and a cost is further reduced.

Preferably, the first is fastened while releasing the second clutch.

According to the invention, for example, with a constitution in which a diaphragm type spring presses the first clutch to be normally fastened, the second clutch is operated for fastening only when releasing the first clutch.

A lever mechanism amplifies an operating force for releasing the first clutch, and a fastening force of the second clutch becomes small. As a result, it is possible to save energy, a durability of an electromagnet is improved, an electromagnet becomes small-sized, and a load of a battery is reduced.

BRIEF DESCRIPTION OF THE ACCOMPANYING DRAWINGS

In the FIGS. 1 to 5, R.D. shows a radial direction, and A.D. shows an axial direction.

DETAILED DESCRIPTION OF THE PREFERRED EMBODIMENTS

First Embodiment

Figure 1:
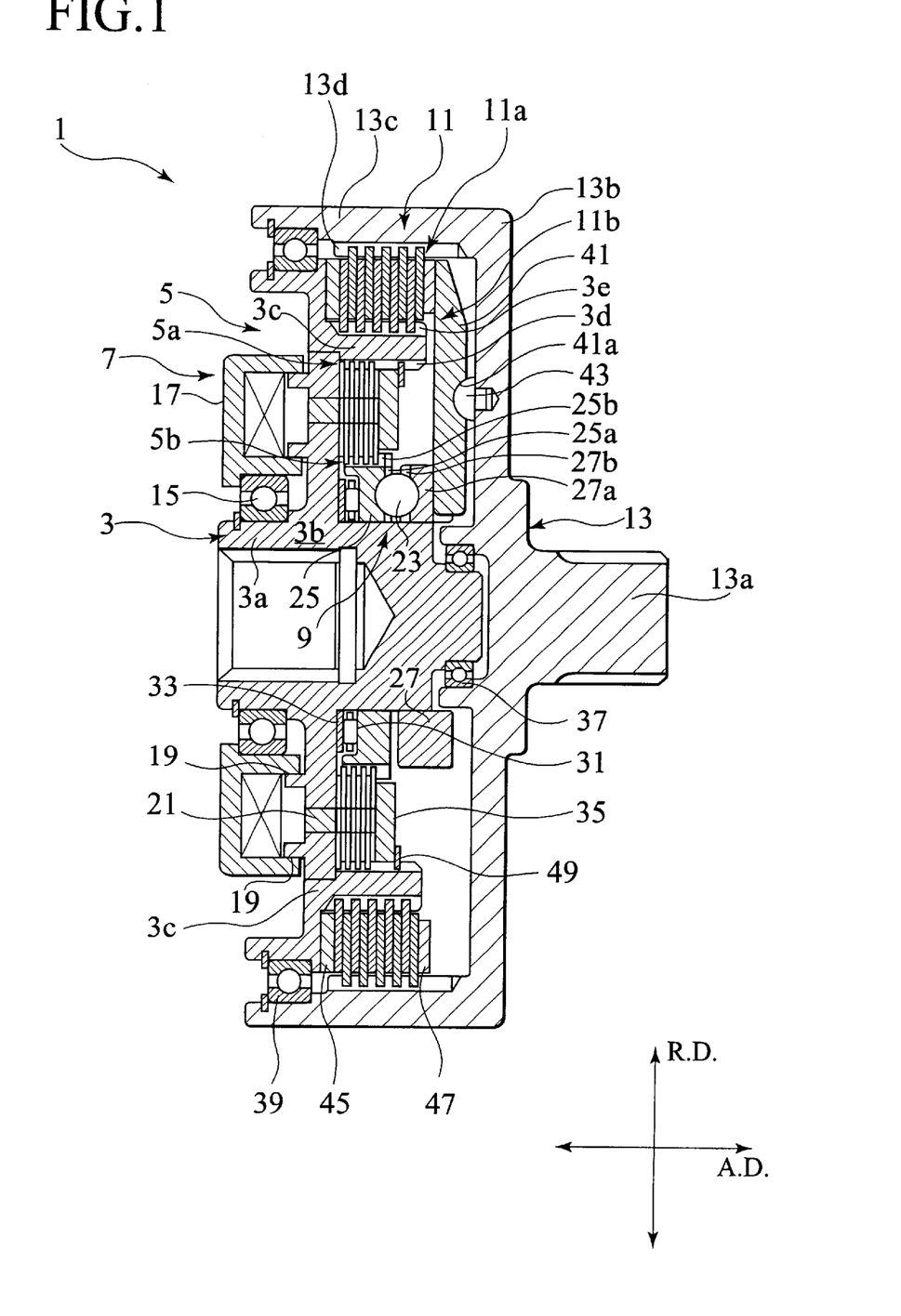
FIG. 1 is a sectional view of a first embodiment according to the invention.

A description will be given of a first embodiment in accordance with the present invention with reference to FIG. 1. FIG. 1 is a cross sectional view of the present embodiment, and a lateral direction thereof corresponds to a lateral direction in FIG. 1. A coupling 1 is supported for rotating within a fixed case (not shown) and a predetermined amount of lubricating oil is charged within the fixed case.

As shown in FIG. 1, the coupling 1 includes a drive shaft 3, a pilot clutch 5, an electromagnet 7, a cam mechanism (an amplifying mechanism) 9, a main clutch 11, a shaft 13 to be driven and the like. The pilot clutch 5 and the main clutch 11 are arranged at the identical position in an axial direction, the main clutch 11 is disposed at an outer side in a radial direction, and the pilot clutch 5 is disposed at an inner side in a radial direction.

The drive shaft 3 includes a shaft part 3a, a rotor part 3b formed in substantially a central part in an axial direction of the shaft part 3a, and a Z-shaped short cylinder part 3c joined to an outer periphery of the rotor part 3b. A drive side member (not shown) is inserted to an axial core part of the shaft part 3a and is spline connected.

The electromagnet 7 is supported on a left end part of the shaft part 3a through a bearing 15. Accordingly, a predetermined amount of gap 19 is kept between a core 17 and the rotor part 3b in the electromagnet 7. The core 17 part is fastened to the fixed case for preventing rotation. Reference character 21 denotes a ring-like non-magnetic material.

A cam mechanism 9 is disposed on a right end part of the drive shaft 3. The cam mechanism 9 is provided with a ball cam and a lever mechanism. The ball cam is structured such that a cam ring 25 and a cam member 27 to be moved in an axial direction are supported with a ball 23 being held therebetween. The cam ring 25 and the cam member 27 have cam faces 25, 27 respectively formed on opposing sides thereof at an equal interval in a peripheral direction, thereby holding the ball 23. A thrust bearing 31 and a washer 33 are arranged on a back side of the cam ring 25 and are subjected to a thrust force when operating the cam.

The pilot clutch 5 is a multiple disc clutch having a plurality of outer plates 5a and inner plates 5b alternately arranged in an axial direction. The outer plates 5a to be moved in the axial direction are connected to a spline part 3d on an inner periphery of the cylinder part 3c provided in the drive shaft 3, and the inner plates 5b to be moved in the axial direction are connected to a spline part 25b on an outer periphery of the cam ring 25.

An armature 35 is disposed at a position adjacent to a right part of the pilot clutch 5 and is positioned by a C-clip 49.

The shaft 13 includes a shaft part 13a, a disc part 13b and an outer cylinder part 13c. The shaft 13 is supported to the drive shaft 3 through bearings 37 and 39 at the shaft part 13a and the cylinder part 13c, respectively. A member to be driven is spline connected to the shaft part 13a.

A main clutch 11 is a multiple disc clutch having a plurality of outer plates 11a and inner plates 11b alternately arranged in an axial direction. The outer plates 11a to be moved in the axial direction are connected to a spline part 13d on an inner periphery of the cylinder part 13c in the shaft 13. The inner plates 11b to be moved in the axial direction are connected to a spline part 3e on an outer periphery of the cylinder part 3c in the drive shaft 3.

Thrust washers 45, 47 prevent the main clutch 11 from an abrasion due to sliding with the rotor part 3b and a pressing lever 41 to be mentioned below, the thrust washer 45 being disposed between the rotor part 3b and the main clutch 11, the thrust washer 47 being disposed between the pressing lever 41 and the main clutch 11.

A plurality of plate-like pressing levers (the amplifying mechanisms, the lever mechanisms) 41 with a width are radially arranged between the main clutch 11 and the disc part 13b of the shaft 13 at an equal interval in a peripheral direction.

An end part of a pressing lever 41 on an axial core side is engaged with each of radial grooves 27a provided on a back side of the cam member 27. On the contrary, an end part of the pressing lever 41 on an outer peripheral side is to be pressed to the main clutch 11. Then, a concave part 41a provided in a middle part in a radial direction of the pressing lever 41 engages with a semispherical convex part 43 fixed to an inner wall of the disc part 13b in the shaft 13, and the pressing lever 41 is supported on the convex part 43 as a fulcrum for swinging. Accordingly, the pressing lever 41 rotates integrally with the cam member 27 and the shaft 13.

In this case, in the present embodiment, the main clutch 11 means a part including the outer plate 11a, the inner plate 11b and the thrust washers 45 and 47. The pilot clutch 5 means a part including the outer plate 5a, the inner plate 5b and the armature 35. The amplifying mechanism means a part including the ball 23, the cam ring 25 and the cam member 27 constituting the cam mechanism 9, and the pressing lever 41 and the convex part 43 constituting the lever mechanism.

Next, a description will be given of an operation of the coupling 1.

When the electromagnet 7 is excited, the armature 35 is attracted and the pilot clutch 5 is fastened. In accordance with this fastening, a rotational difference between the cam ring 25 and the cam member 27 causes a cam effect, which makes a the cam member pressed rightward to be moved. At this time, a fastening torque of the pilot clutch 5 is converted into a thrust force due to the cam effect and amplified so as to press the cam member 27. The thrust force of the cam member 27 is applied to the pressing lever 41 to be swung about a fulcrum, or the convex part 43. The outer peripheral side end part thereof presses the main clutch 11 to be fastened to itself.

It is possible to control the fastening torque of the main clutch 11 by adjusting the fastening torque of the pilot clutch 5 by means of the electromagnet 7.

Since the pilot clutch 5 is released when the excitation of the electromagnet 7 is stopped, the main clutch 11 is released without a pressing function of the pressing lever 41.

As mentioned above, in accordance with the present embodiment, since the pilot clutch 5 and the main clutch 11 are substantially completely overlapped with each other in an axial direction (arranged at the identical position in the axial direction), the coupling 1 can be shortened in an axial length so as to be compact, so that a space in the axial direction becomes small and a vehicle mounting property is largely improved.

In this case, there is shown the structure in which the pilot clutch 5 and the main clutch 11 are substantially completely overlapped in the axial direction (the outer plates 5a and 11a and the inner plates 5b and 11b are arranged at substantially the identical position in the axial direction). In the present invention, "overlapping in an axial direction (a direction of the rotational axis)" means that projections in a radial direction are overlapped with each other. The phrase of "having an overlapping part" means that there is an overlapping part even in a part of the constituting elements.

That is, this structure includes a case that the overlapping part exists in a part of the elements such as the armature 35, the thrust washer 45 constituting the pilot clutch 5 and the main clutch 11 as well as the outer plates 5a and 11a and the inner plates 5b and 11b.

Further, since the main clutch 11 is arranged at an outer side in a radial direction, it is easy to set a capacity of a clutch to a large amount. In addition, it is possible to reduce the number of the outer plate 11a and the inner plate 11b required for obtaining the same capacity of the clutch so as to further reduce the size and the weight of the coupling 1.

Further, since it is easy to set an arm ratio around a supporting point (the convex part 43) of the pressing lever 41 to be large, it is easy to increase an amplifying rate of the pressing force of the main clutch 11.

Further, the coupling 1 structured such as to operate the pilot clutch 5 by the electromagnet 7 can be realized with a simple structure, for example, in comparison with the case that a hydraulic system or the like is employed for operating the pilot clutch 5, so that it is possible to accurately control a transmission torque of the coupling.

Further, since the electromagnet 7 is disposed at a position adjacent to the pilot clutch 5 in the axial direction, an operation response of the coupling 1 can be largely improved, for example, in comparison with a structure for operating the pilot clutch 5 through an intermediate member.

Further, since the cam mechanism 9 makes the pressing force of the main clutch 11 strengthened, a torque transmission capacity between the main clutch 11 and the coupling 1 is increased, and it is possible to reduce the size and the weight of these elements, whereby a vehicle mounting property can be improved.

Further, since the main clutch 11 and the pilot clutch 5, and the pressing lever 41 corresponding to a part of the amplifying mechanism are respectively arranged in the axial direction to overlap with each other in the radial direction, the coupling 1 is made compact also in the radial direction, so that a vehicle mounting property can be further improved.

In this case, in the present invention, "overlapping in a radial direction" means that projections in an axial direction, or a direction of a rotational axis, are overlapped with each other. "Having an overlapping part" means that there is an overlapping part even in a part of the constituting elements.

Further, the ball cam of the cam mechanism 9 to be operated in accordance with an application of the transmission torque between the drive shaft 3 and the shaft 13 is arranged at a position close to the rotational axis and radially inside the main clutch 11 and the pilot clutch 5, and a toque to be applied to the cam mechanism 9 is increased. Thus the torque transmission capacity between the main clutch 11 and the coupling 1 is further strengthened, and it is possible to make these elements more compact and lighter.

Further, disposing the cam mechanism 9 at a position close to the rotational axis makes the pressing lever lengthened at that degree and a selection range of the swing motion fulcrum 43 widened. Thus, it is possible to further strengthen the torque transmission capacity between the main clutch 11 and the coupling 1.

Further, the pressing lever 41 is disposed so as to axially oppose to each of the main clutch 11, the pilot clutch 5 and the ball cam of the cam mechanism 9 each arranged in the radial direction. Thus, the coupling 1 is made more compact in the radial direction in comparison with the structure where the pressing lever 41 is arranged in the radial direction.

Further, since the inner plate 11b of the main clutch 11 and the outer plate 5a of the pilot clutch 5 are connected to the cylinder part 3c of the drive shaft 3, the number of the parts can be reduced in comparison with the structure in which these elements are connected to the separated members, so that the coupling 1 can be made further compact and light.

Further, since the inner plate 11b of the main clutch 11 is connected to the outer peripheral side of the cylinder part 3c and the outer plate 5a of the pilot clutch 5 is connected to the inner peripheral side of the cylinder part 3c, it is possible to arrange the main clutch 11 and the pilot clutch 5 in the radial direction.

Second Embodiment

Figure 2:
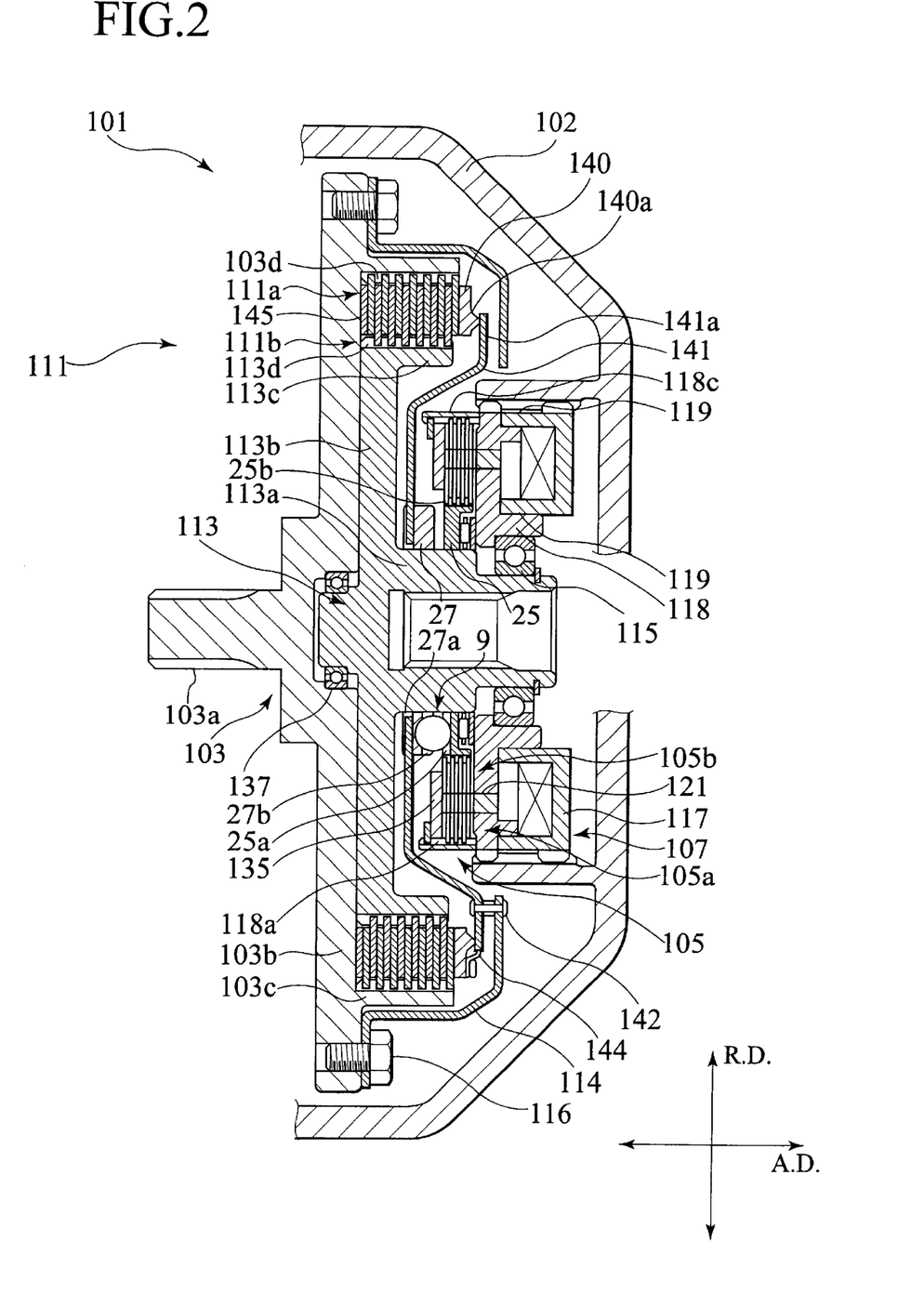
FIG. 2 is a sectional view of a second embodiment.

A description will be given of a second embodiment in accordance with the present invention with reference to FIG. 2. FIG. 2 is a cross sectional view of the present embodiment. A main clutch 111 is normally fastened to a coupling 101, and an electromagnet is energized so as to fasten a pilot clutch 105 only when releasing the main clutch 111. This is a main point which is different from the first embodiment mentioned above, and constituting parts therefor are different and the other structures are similar, an overlapping description will be omitted.

As shown in FIG. 2, the coupling 101 is received within a clutch housing 102, and a predetermined amount of oil is charged into the clutch housing 102. The coupling 101 includes a drive shaft 103, a multi disc type pilot clutch 105 and main clutch 111, an electromagnet 107, a cam mechanism 9, a shaft 113 to be driven and the like.

The pilot clutch 105 and the main clutch 111 are arranged at substantially the identical position in an axial direction, the main clutch 111 is disposed at an outer side in a radial direction, and the pilot clutch 105 is disposed at an inner side in the radial direction.

The drive shaft 103 has a shaft part 103a and a disc part 103b formed integrally with each other. A short cylinder part 103c formed integrally with the disc part 103b close to an outer periphery of the disc part 103b. A drive member (not shown) is spline connected to the shaft part 103a. A clutch cover 114 is fixed to an outer periphery of the disc part 103b by bolts 116.

On the contrary, the shaft 113 includes a shaft part 113a, a disc part 113b and a short cylinder part 113c disposed in an outer periphery. The shaft 113 is supported to the drive shaft 103 at an end thereof through a bearing 137 and is spline connected to a member to be driven (not shown) at an inner periphery of another end thereof.

The pilot clutch 105 is a multiple disc clutch having a plurality of outer plates 105a and inner plates 105b alternately arranged in an axial direction. The outer plates 105a to be moved in the axial direction are connected to a spline part 118a on an inner periphery of a short cylinder part 118c of a rotor 118. The inner plates 105b to be moved in the axial direction are connected to the spline part 25b on the outer periphery of the cam ring 25.

The main clutch 111 is a multiple disc clutch having a plurality of outer plates 111a and inner plates 111b alternately arranged in an axial direction. The outer plates 111a to be moved in the axial direction are connected to a spline part 103d on an inner periphery of the cylinder part 103c in the drive shaft 103. The inner plates 111b to be moved in the axial direction are connected to a spline part 113d on an outer periphery of the cylinder part 113c in the shaft 113.

A thrust washer 145 prevents the outer plate 111a from being abraded due to sliding with the disc part 103b of the drive shaft 103.

A ring-like pressure plate 140 is disposed at a right end part of the outer plate 111a and the inner plate 111b. An outer end part 141a of a release lever 141 (mentioned below) is brought into contact with a ring-like projection part 140a formed at a side of the pressure plate 140 opposite to the plates 111a, 111b.

Each release lever 141 is arranged in a radial direction and at an equal interval in a peripheral direction and is fastened to the clutch cover 114 at the vicinity of the outer end part 141a by a pin 142. The outer end part 141a of the release lever 141 is fixed to a diaphragm spring 144 with a radial arm part. The diaphragm 144 is brought in contact with the pressure plate 140 to be slid. On the contrary, an inner peripheral edge of the release lever 141 is engaged with a radial groove 27a to be fixed thereto, which is provided in the cam member 27 constituting the cam mechanism 9, and thus being a part of the constitution parts of the cam mechanism 9.

As mentioned above, the release lever 141 deforms the diaphragm spring 144 mentioned above at a predetermined amount to press the pressure plate 140 leftward, with the lever being fastened and assembled to the clutch cover 114 by the pin 142. Accordingly, the main clutch 111 is normally fastened. Then, the release lever 141 rotates integrally with the drive shaft 103 and the shaft 113 as well as the cam member 27.

A right end part of the shaft 113 is supported to the rotor 118 connected to the clutch housing 102 through a bearing 115. Further, the short cylinder part 118c is joined integrally to an outer periphery in a left end part of the rotor 118. The electromagnet 107 is disposed at a position rightward adjacent to the rotor 118, and the core 117 is positioned in the clutch housing 102 to be prevented from being rotated. Accordingly, a gap 119 is kept at a predetermined value. Reference character 121 denotes a ring-like nonmagnetic member. Further, the cam mechanism 9 is disposed on the shaft 113.

Then, the pilot clutch 105 is disposed between the inner periphery of the short cylinder part 118c of the rotor 118 and the outer periphery of the cam ring 25, and is released when fastening the main clutch 111.

In this case, in the second embodiment, the main clutch 111 means a part including the outer plate 111a, the inner plate 111b, the thrust washers 145 and the pressure plate 140. The pilot clutch 105 means a part including the outer plate 105a, the inner plate 105b and the armature 135. The amplifying mechanism means a part including the cam mechanism 9 of the ball 23, the cam ring 25 and the cam member 27, and the release lever 141.

Next, a description will be given of an operation of the coupling 101.

When the electromagnet 107 is excited, the armature 135 is attracted and the pilot clutch 105 is fastened. In accordance with this fastening, a rotational difference between the cam ring 25 and the cam member 27 causes a cam effect, which makes the cam member 27 pressed leftward to be moved. In correspondence to the movement of the cam lever 27, the release lever 141 swings about the pin 142 corresponding to a fulcrum. The diaphragm spring 144 at the outer end part 141a of the release lever 141 and the pressure plate 140 move apart from the clutch plate of the main clutch 111 and the pressing force to the main clutch 111 is cancelled, whereby the main clutch 111 is released.

As mentioned above, in accordance with the present embodiment, since the pilot clutch 105 and the main clutch 111 are substantially completely overlapped with each other in an axial direction (arranged at the identical position in the axial direction), the coupling 101 can be structured to be compact in the axial direction, so that a vehicle mounting property is largely improved.

Further, since the main clutch 111 is fastened at most of the operating time and the electromagnet 107 is excited only when releasing the main clutch 111, it is possible to obtain a great save energy effect.

Further, when releasing the main clutch 111, the fastening torque of the pilot clutch 105 is converted and amplified by the cam mechanism 9 so as to become a force for moving the cam member 27. In addition, the torque is amplified in accordance with a lever ratio of the release lever 141 about the fulcrum (the pin 142), thus to become a force for moving the diaphragm spring 144 from the clutch disc. As mentioned above, it is possible to save a consumed current as well as the electromagnet 107 is made compact.

Further, when fastening the main clutch 111, adjusting the fastening torque of the pilot clutch 105 by means of the electromagnet 107 makes it possible to control the main clutch 111 for smoothly fastening.

Further, since the main clutch 111 is disposed at the outer side in the radial direction, it is possible to set the torque capacity to a large amount, and further it is possible to reduce the number of the outer plate 111a and the inner plate 111b under the condition of the same torque capacity.

In addition to the effects mentioned above, in accordance with the structure in which the electromagnet 107 is disposed at a position adjacent to the pilot clutch 105 in the axial direction, the pressing force of the main clutch 111 is strengthened by the cam mechanism 9, the release lever 141, the main clutch 111 and the pilot clutch 105 constituting a part of the cam mechanism 9 are respectively arranged in the axial direction and overlapped with each other in the radial direction, the cam mechanism 9 to be operated by an application of the rotational torque of the shaft 113 is arranged at a position close to the rotational shaft inside the main clutch 111 and the pilot clutch 105 in the radial direction, and the release lever 141 corresponding to the operating member for the main clutch 111 is disposed so as to oppose to each of the main clutch 111, the pilot clutch 105 and the cam mechanism 9 in the axial direction, which are arranged in the radial direction, the coupling 101 can obtain the same benefits as those of the coupling 1 in accordance with the first embodiment.

Third Embodiment

Figure 3:
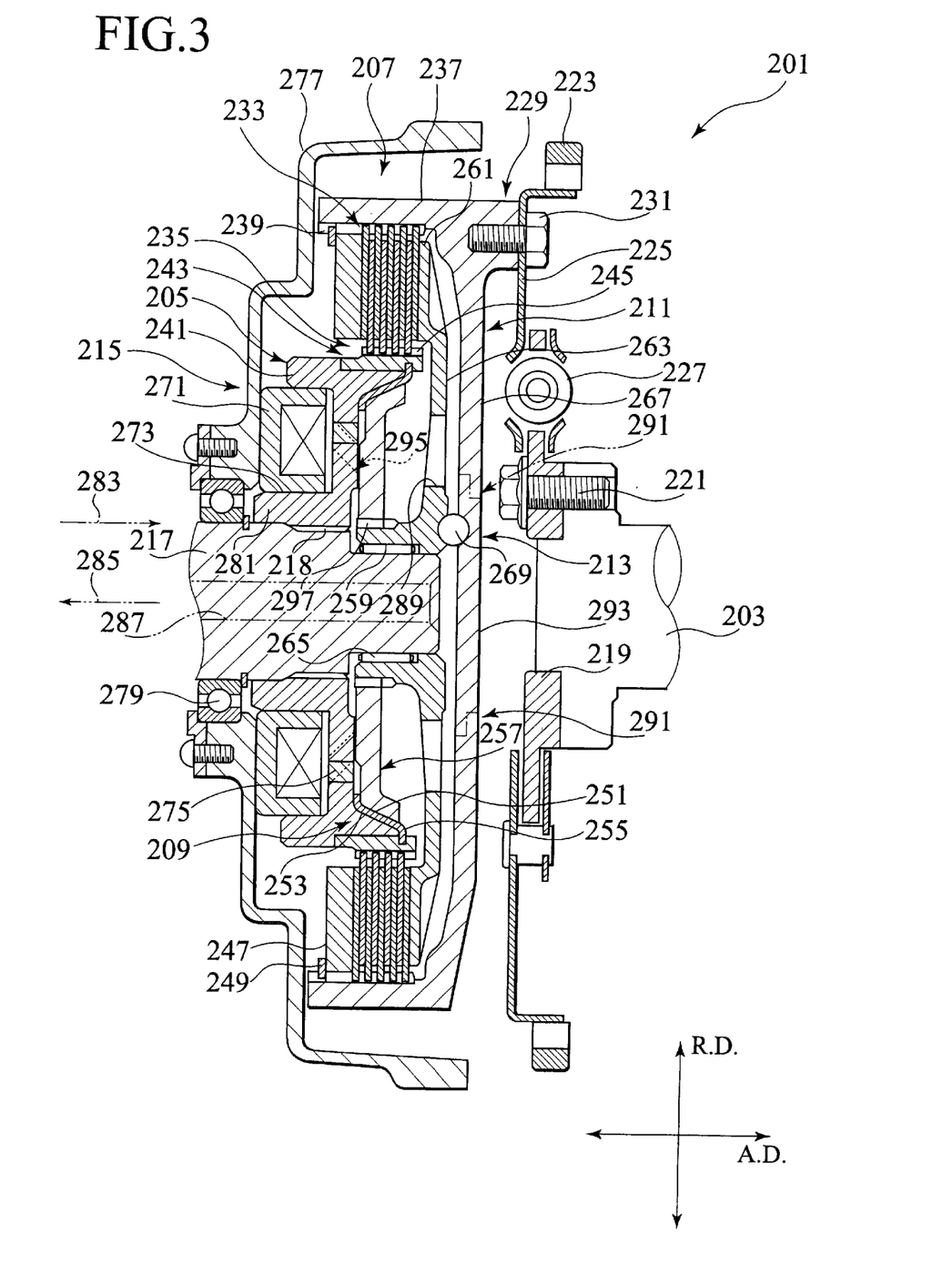
FIG. 3 is a sectional view of a third embodiment.

A description will be given of a third embodiment in accordance with the present invention with reference to FIG. 3. FIG. 3 is a cross sectional view showing a coupling 201 in accordance with the present embodiment, and the coupling 201 is a start clutch constituting an automatic transmission (AT) of a vehicle. In this case, a lateral direction thereof corresponds to a lateral direction in FIG. 3, and members to which no reference characters are not illustrated.

The coupling 201 includes an engine crank shaft 203, a rotor 205 (a torque transmission member) made of a magnetic material, a multi disc type main clutch 207, a pilot clutch 209 (a cone clutch), a pressing member 211 (an operating member), a ball cam 213 (an amplifying mechanism: a cam mechanism), an electromagnet 215, an output shaft 217 on a side of an automatic transmission mechanism, and the like. An engine is arranged on a right side of the coupling 201, and an automatic transmission mechanism is arranged on a left side.

A flange member 219 is fixed to the crank shaft 203 by a bolt 221. A disc 225 with an outer periphery to which a ring gear 223 for driving the engine is welded and the flange member 219 are connected to each other through a torsion spring 227. The torsion spring 227 absorbs a rotational change of the engine by a damper function thereof.

A clutch casing 229 (a main clutch side member) is fixed to the disc 225 by a bolt 231.

The rotor 205 is connected to the output shaft 217 by a spline 218.

The main clutch 207 is a multi disc clutch with a plurality of outer plates 233 and inner plates 235 which are alternately arranged in an axial direction. The clutch 207 is disposed between the clutch casing 229 and the rotor 205. The outer plates 233 to be moved in an axial direction are connected to a spline part 239 on an inner periphery of a cylinder part 237 formed in an outer peripheral side of the clutch casing 229. The inner plates 235 to be moved in an axial direction are connected to a spline part 245 on an outer periphery of a ring 243 welded to a cylinder part 241 formed in an outer periphery of the rotor 205.

Further, pressure receiving member 247 is disposed at a left side of the outer plates 233 and the inner plates 235, is connected to the spline part 239 of the cylinder part 237 and is positioned by the snap ring 249.

Any one of steel, carbon and paper plates can be selectively employed for the outer plates 233 and the inner plates 235 so as to have a desired strength, durability and property for a peripheral environment such as a lubricating oil or the like, with respect to the coupling.

The pilot clutch 209 has a pair of conical friction surfaces 251 and 253. The friction surface 251 is formed between the friction plate 255 fixed to an inner side in a radial direction of the ring 243 and an outer periphery of the armature 257 disposed at an inner side in a radial direction of ring 243. The friction surface 253 is formed between an inner periphery of the cylinder part 241 of the rotor 205 and the friction plate 255.

In this case, the main clutch 207 in the third embodiment means a part including the outer plates 233, the inner plates 235 and the pressure receiving members 247. The pilot clutch 209 means a part including the rotor 205 on which the friction surfaces 251 and 253 are formed and the armature 257.

As mentioned above, the main clutch 207 and the pilot clutch 209 are arranged at substantially the identical position in the axial direction (are substantially completely overlapped with each other in the axial direction), and the pilot clutch 209 is disposed at the inner side in the radial direction of the main clutch 207.

Further, as mentioned above, the main clutch 207 is disposed at an outer side in the radial direction of the cylinder part 241 of the rotor 205 and the ring 243, and the pilot clutch 209 is disposed at the inner side in the radial direction.

The pressing member 211 includes a boss part 259 formed at an inner side in the radial direction, a pressing part 261 (an operating part) formed at an outer side in the radial direction and opposing to the main clutch 207 in the axial direction, and a disc-like connecting part 263 connecting therebetween.

The boss part 259 is supported to the output shaft 217 through a needle bearing 265, and the armature 257 mentioned above is spline connected to an outer periphery of the boss part 259.

The ball cam 213 is structured such that a ball 269 is disposed in cam grooves respectively formed on the boss part 259 of the pressing member 211 and a disc part 267 of the clutch casing 229.

As mentioned above, the ball cam 213 is disposed at an inner side in the radial direction of the pilot clutch 209. The connecting part 263 of the pressing member 211 connects between the ball cam 213 and the pressing part 261 over the pilot clutch 209.

In this case, the amplifying mechanism in this third embodiment means a part including the ball 269 constituting the ball cam 213, the pressing member 211 formed with the cam groove, and the disc part 267 of the clutch casing 229.

A core 271 of the electromagnet 215 is fixed to a clutch housing 277, and is disposed in a recessed part 273 formed in the rotor 205 through a predetermined air gap. A non-magnetic ring 275 separates an outer side and an inner side of the rotor 205 from each other in the radial direction, thus to prevent a short circuit of a magnetic force. An outer periphery of the ring 275 is welded to an inner periphery of the rotor 205 by means of an electron beam The clutch housing 277 is fixed to a vehicle body, and the output shaft 217 is supported to the clutch housing 277 through a ball bearing 279 without seal.

When the electromagnet 215 is excited, the armature 257 is attracted and the pilot clutch 209 is fastened, so that the pressing member 211 is connected to a side of the output shaft 217. In this state, the engine torque is applied to the ball cam 213, the pressing member 211 moves leftward due to a generated cam thrust force (an operating force: a pressing force), and the pressing part 261 presses the main clutch 207 to be fastened.

In the manner mentioned above, the coupling 201 is connected and the vehicle is made in a state capable of starting.

In this case, the cam thrust force of the ball cam 213 pressing the main clutch 207 at this time is applied to the pressure receiving member 247 on the clutch casing 229. The cam reaction force is applied to the disc part 267 of the clutch casing 229. As mentioned above, the pressing force of the main clutch 207 and the reaction force thereof are cancelled on the clutch casing 229.

Further, when controlling the exciting current of the electromagnet 215 so as to adjust an attraction force of the armature 257, the cam thrust force of the ball cam 213 is changed due to the slide motion of the pilot clutch 209, the transmission torque of the main clutch 207 (the coupling 201) is changed, and it is possible to adjust the drive force of the engine to be transmitted to the wheels.

Further, at a time of shift operation, the excitation of the electromagnet 215 is stopped.

When stopping the excitation of the electromagnet 215, the pilot clutch 209 is released, whereby the cam thrust force of the ball cam 213 is cancelled, and the main clutch 207 is released, whereby the connection of the coupling 201 is removed, then the shift operation can be easily performed.

Further, the clutch casing 229 in which the cam groove of the ball cam 213 is formed on the disc part 267 is necessarily structured such that a surface hardening, such as, a high frequency induction hardening, a soft nitriding (nitrocarburizing) treatment or the like is applied, in order to keep a strength (a load capacity) of the cam groove.

Then, since it is possible to apply a surface hardening only to the inner member 293 having a simple shape with the cam groove and a small mass when separating the disc part 267 as shown by an arrow 291, a heat treatment cost is widely reduced and a productivity is largely improved in comparison with the case of applying a heat treatment to a whole of the clutch casing 229.

The member 293 after the heat treatment is formed integrally with the outer member by welding, pressure bonding, or other adhering means.

In this case, the engine torque is, for example, between 100 and 300 Nm. Further, since a great torque passes through the main clutch 207 from the cylinder part 237 of the clutch casing 229 and no great torque is applied to the disc part 267, a sufficient durability can be obtained without a hardened material for the inner member 293.

On the contrary, as mentioned above, an elongated hole in a rotational direction and a connection hole may be alternately provided in the rotor 205 corresponding to the passing passage for the torque, in place of the disposal of the non-magnetic ring 275.

The non-magnetic ring and the elongated hole may be suitably selected in correspondence to the strength, durability, clutch property and the like.

Further, when the ring 275 is formed in a shape as shown by an arrow 295, a joining area becomes wide and a strength is improved, and further, a magnet shutting function is improved.

In this case, a joining means for the joining part is not limited to the electron beam welding, and can be selected to the other welding means, a copper brazing or the like, taking the rotational torque into consideration.

As mentioned above, in accordance with the present embodiment, since the pilot clutch 209 and the main clutch 207 are substantially completely overlapped with each other in the axial direction (arranged at the same position in the axial direction), the coupling 201 is structured to be compact in the axial direction and the vehicle mounting property is largely improved.

In this case, there is shown the structure in which the pilot clutch 209 and the main clutch 207 are substantially completely overlapped with each other in the axial direction (the outer plates 233, the inner plates 235 and the friction surfaces 251 and 231 are arranged at substantially the identical position in the axial direction). In the present invention, "overlapping in an axial direction (in a direction of a rotational axis)" means that the projections in the radial direction are overlapped with each other, and "having an overlapping part" means that there is an overlapping part even in a part of the constituting elements.

That is, this structure includes a case that the overlapping part exists in a part of the elements such as the armature 35, the pressure receiving member 247 or the like constituting the pilot clutch 5 and the main clutch 11, as well as the outer plates 233, the inner plates 235 and the friction surfaces 251 and 253.

Further, since the main clutch 207 is disposed at an outer side in the radial direction, it is easy to set a capacity of the clutch to a large amount, and further it is possible to reduce the number of the outer plates 233 and the inner plates 235 in the case that the clutch capacity is the same, so that the coupling 201 becomes more compact in the axial direction and light.

Further, the coupling 201 structured such as to operate the pilot clutch 209 by the electromagnet 215 has a simple structure in comparison with the case that a hydraulic system or the like is employed, and it is possible to accurately control a torque transmission property.

Further, since the electromagnet 215 is disposed at a position adjacent to the pilot clutch 209 in the axial direction, an operation response of the coupling 201 can be largely improved, for example, in comparison with a structure for operation of the pilot clutch 209 through an intermediate member.

Further, since the ball cam 213 strengthens the pressing force of the main clutch 207, a torque transmission capacity of the main clutch 207 and the coupling 201 is increased, and it is possible to make them more compact and lighter, whereby a vehicle mounting property can be improved.

Further, since the main clutch 207 and the pilot clutch 209, and the pressing member 211 constituting a part of the ball cam 213 are respectively arranged in the axial direction (are overlapped in the radial direction), the coupling 201 is made compact also in the radial direction, so that a vehicle mounting property can be further improved.

In this case, in the present invention, "overlapping in a radial direction" means that projections in an axial direction (a direction of a rotational axis) are overlapped with each other, and "having an overlapping part" means that there is an overlapping part even in a part of the constituting elements.

Further, since the ball cam 213 to be operated in accordance with an application of the transmission torque between the crank shaft 203 and the output shaft 217 is disposed at a position close to the rotational axis and at an inner side in a radial direction of the main clutch 207 and the pilot clutch 209, a toque to be applied to the ball cam 213 is increased, so that the torque transmission capacity between the main clutch 207 and the coupling 201 is further strengthened and it is possible to make these elements more compact and more light.

Further, since the pressing member 211 of the main clutch 207 is disposed so as to axially oppose to each of the main clutch 207, the pilot clutch 209 and the ball cam 213 each disposed in the radial direction, the coupling 201 is made more compact in the radial direction in comparison with the structure of the disposal of the pressing member 211 in the radial direction.

Further, since the main clutch 207 is disposed at an outer side in the radial direction of the cylinder part 241 of the rotor 205 and the ring 243 and the pilot clutch 209 is disposed at an inner side in the radial direction thereof, the number of the parts can be reduced in comparison with the structure in which these elements are connected to the different members, the coupling 201 can be made more compact and lighter, and it is possible to dispose the main clutch 207 and the pilot clutch 209 in the radial direction.

Further, since the ball cam 213 is disposed between the pressing member 211 of the main clutch 207 and the clutch casing 229, the pressing force of the main clutch 207 and the reaction force thereof are cancelled within the main clutch 207, so that a durability of these elements is largely improved without application of a load to the peripheral member of the main clutch 207.

Further, for example, since a self-lock is not generated even when the thrust bearing for receiving the pressing force is not disposed between the clutch casing 229 and the outer member relatively rotating therewith, the thrust bearing mentioned above is not required, the cost can be reduced at that degree, the structure can be compact and a freedom on design can be improved.

Further, since the ball cam 213 corresponding to the amplifying mechanism is compact and can obtain a large pressing force, the torque transmission capacity between the main clutch 207 and the coupling 201 can be further strengthened without increment of the load on the disposal space.

Further, since the pilot clutch 209 corresponding to the cone clutch has the small number of friction surfaces, a sliding torque when canceling the connection is smaller in comparison with the multi disc clutch with a large number of friction surfaces.

Accordingly, since the sliding torque is small in the coupling 201 employed for the automatic clutch of an automatic transmission vehicle, a level of a judder sound is low and the torque can be substantially completely removed at a time of shift operation, so that a smooth shift operation can be performed.

Further, since a capacity of the synchronous mechanism can be made small, a cost can be reduced at that degree.

Further, since the pilot torque is applied to the pressing member 211 from the spline part 297 with the armature 257 at the side of the pilot clutch 209, and the other torque is not applied, generation of hysteresis of the transmission torque can be restricted to a significantly small level, in the coupling 201.

In this case, in the present embodiment, though there is shown the embodiment of the releasing type of coupling 201, to dispose a seal between the pressure receiving member 247, the clutch casing 229 and the rotor 205 or between the pressure receiving member 247 and the clutch housing 277 allows the coupling 201 to be made in a sealed type and a wet type in which a desired amount of oil is charged.

In the sealed type coupling 201, for example, if an inflow side oil flow passage 287 is formed between the boss part 281 of the rotor 205 and the output shaft 217 as shown by an imaginary line, and an ATF (automatic transmission oil) is supplied to the inner part therefrom by an AT pump (oil pump) of the automatic transmission as shown by an arrow 283, the oil is applied to the needle bearing 265, the pilot clutch 209, the main clutch 207 and the like due to the pressure of the pump and a centrifugal force.

The oil lubricating and cooling the elements passes through the connecting part 263 of the pressing member 211 and the disc part 267 of the clutch casing 229 thus to lubricate and cool the ball cam 213, and is returned to the automatic transmission mechanism side through the oil flow passage 287 formed in the output shaft 217, as shown by an arrow 285.

Further, an opening 289 is provided in the connecting part 263 of the pressing member 211 so as to promote the oil circulation mentioned above and to reduce a resistance of the oil applied to the pressing member 211, thereby increasing an operation response of the coupling 201.

As mentioned above, by using the oil pump for the automatic transmission, no exclusive oil pump is required and the cost can be further reduced.

Further, in the structure in which the coupling 201 is made in the sealed type and in the wet type by the ATF (automatic transmission oil), since it is possible to sufficiently lubricate and cool in a state in which the contamination such as metal abraded powers or the like is a little, it is possible to obtain a sufficient durability even when employing the carbon and the paper for the outer plates 233 and the inner plates 235 of the main clutch 207, so that the structure can be realized at a low cost.

In this case, in the structure such as the coupling 201 employing the cone clutch for the pilot clutch, the cone clutch may be employed for the main clutch in addition to the multi disc clutch, and further a single disc clutch may be employed.

Further, the clutch disc of the multi disc clutch and the single disc clutch may, of course, employ any one of a steel, a carbon and a paper as mentioned above.

Fourth Embodiment

Figure 4:
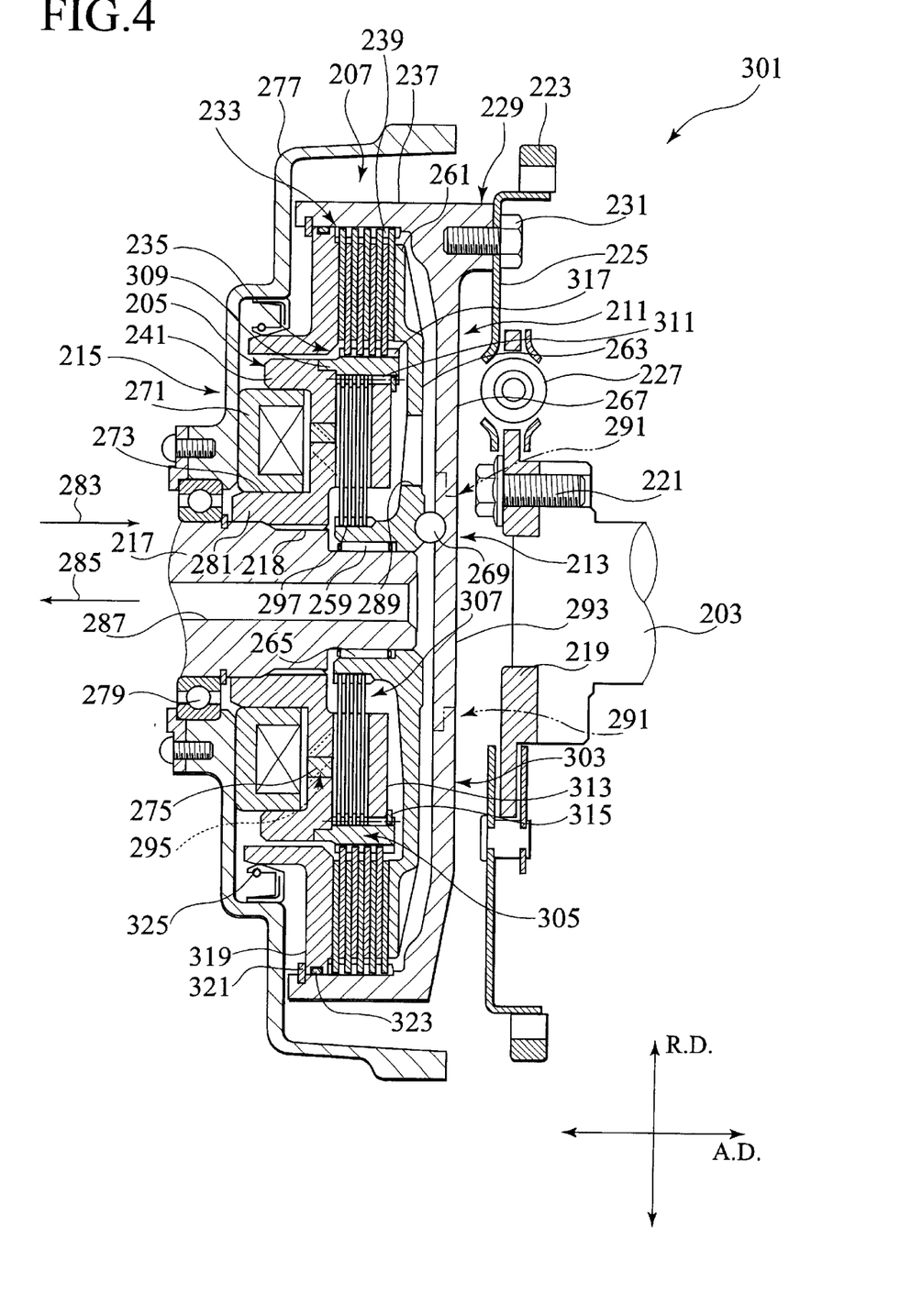
FIG. 4 is a sectional view of a fourth embodiment.

A description will be given of a fourth embodiment in accordance with the present invention with reference to FIG. 4. FIG. 4 is a cross sectional view showing a coupling 301 in accordance with the present embodiment, and the coupling 301 is structured such that a multi disc clutch is used in the pilot clutch part of the coupling 201 in accordance with the third embodiment and is a start clutch constituting an automatic transmission (AT) of a vehicle. Accordingly, an overlapping description with the third embodiment mentioned above will be omitted. Further, members to which no reference characters are not illustrated.

The coupling 301 includes an engine crank shaft 203, a rotor 205 made of a magnetic material, a multi disc type main clutch 207, a pilot clutch 303, a pressing member 211, a ball cam 213, an electromagnet 215, an output shaft 217 at a side of the automatic transmission mechanism, and the like. An engine is disposed on a right side of the coupling 301, and an automatic transmission mechanism is disposed on a left side thereof.

A description will be mainly given below of a difference from the coupling 201 with citing the same elements as those of the coupling 201 by applying the same reference characters thereto.

The multi disc type pilot clutch 303 has a plurality of outer plates 305 and inner plates 307 which are alternately arranged in an axial direction, and is disposed between the rotor 205 and the pressing member 211 of the ball cam 213.

A ring 309 is welded to the cylinder part 241 on the outer periphery of the rotor 205. The outer plates 305 to be moved in an axial direction are connected to a spline part 311 provided on an inner periphery of the ring 309. The inner plates 307 to be moved in an axial direction are connected to a spline part 297 provided on an outer periphery of the boss part 259 of the pressing member 211.

An armature 313 is disposed at a right side of the outer plates 305 and the inner plates 307 and is positioned to the ring 309 by a snap ring 315.

Further, The ring 309 has a spline part 317 provided on an outer periphery thereof, the spline part being connected with the inner plate 235 of the main clutch 207.

Pressure receiving members 319 are disposed at a left side of the inner plates 235, and positioned to the cylinder part 237 of the clutch casing 229 by the snap ring 249.

An O-ring 323 is disposed between the cylinder part 237 and the pressure receiving member 319, and an oil seal 325 is disposed between the pressure receiving member 319 and the clutch housing 277, whereby the coupling 301 is made in a sealed type.

Any one of steel, carbon and paper can be employed for the outer plates 233 and the inner plates 235 of the main clutch 207 and the outer plates 305 and the inner plates 307 of the pilot clutch 303.

In this case, the main clutch 207 in the fourth embodiment means a part including the outer plates 233, the inner plates 235 and the pressure receiving members 319. The pilot clutch 209 means a part including the outer plates 305, the inner plates 307 and the armature 313.

As mentioned above, the main clutch 207 and the pilot clutch 303 are arranged at substantially the identical position in the axial direction (are substantially completely overlapped with each other in the axial direction), and the pilot clutch 303 is disposed at the inner side of the main clutch 207 in the radial direction.

Further, as mentioned above, the main clutch 207 is disposed at an outer side in the radial direction of the cylinder part 241 of the rotor 205 and the ring 243, and the pilot clutch 303 is disposed at the inner side in the radial direction.

When the electromagnet 215 is excited, the armature 313 is attracted and the pilot clutch 303 is fastened, so that the ball cam 213 operated due to application of the torque of the engine presses the main clutch 207 through the pressing member 211, and the coupling 301 is connected, thus to allow the vehicle to be started.

At this time, the pressing force of the ball cam 213 pressing the main clutch 207 and the reaction force thereof are cancelled on the clutch casing 229.

Further, when controlling the exciting current of the electromagnet 215 thus to adjust an attraction force of the armature 313, the cam thrust force of the ball cam 213 is changed due to the slide motion of the pilot clutch 303, the transmission torque of the main clutch 207 (the coupling 301) is changed, and it is possible to adjust the drive force of the engine transmitted to the wheels.

At a time of shift operation, when stopping the excitation of the electromagnet 215, the pilot clutch 303 is released, whereby the cam thrust force of the ball cam 213 is cancelled, and the main clutch 207 is released. The connection of the coupling 301 is released, and the shift operation can be easily performed.

The seal type coupling 301 is structured such as to form the oil flow passage between the boss part 281 of the rotor 205 and the output shaft 217 in the same manner as the coupling 201 of a sealed type mentioned above. The automatic transmission oil (ATF) is supplied to the inner part by the AT pump of the automatic transmission therefrom as shown by an arrow 283.

The supplied oil is applied to the needle bearing 265, the pilot clutch 303, the main clutch 207 and the like due to the pressure of the pump and the centrifugal force. It lubricates and cools the elements, and thereafter passes through the connecting part 263 of the pressing member 211 and the disc part 267 of the clutch casing 229 so as to lubricate and cool the ball cam 213. It returns to the automatic transmission mechanism side through the oil flow passage 287 of the output shaft 217, as shown by the arrow 285.

As mentioned above, in accordance with the present embodiment, the same benefits as those of the coupling 201 can be obtained except the benefit obtained by employing the cone clutch for the pilot clutch 209 in the coupling 201 in accordance with the third embodiment.

In this case, in the coupling 301, an O-ring may be disposed between the pressure receiving member 319 and the rotor 205, in place of the disposal of the oil seal 325.

In accordance with this structure, there is no seal disposed between the relative rotating members, and a durability of the seal and the coupling can be improved.

Fifth Embodiment

Figure 5:
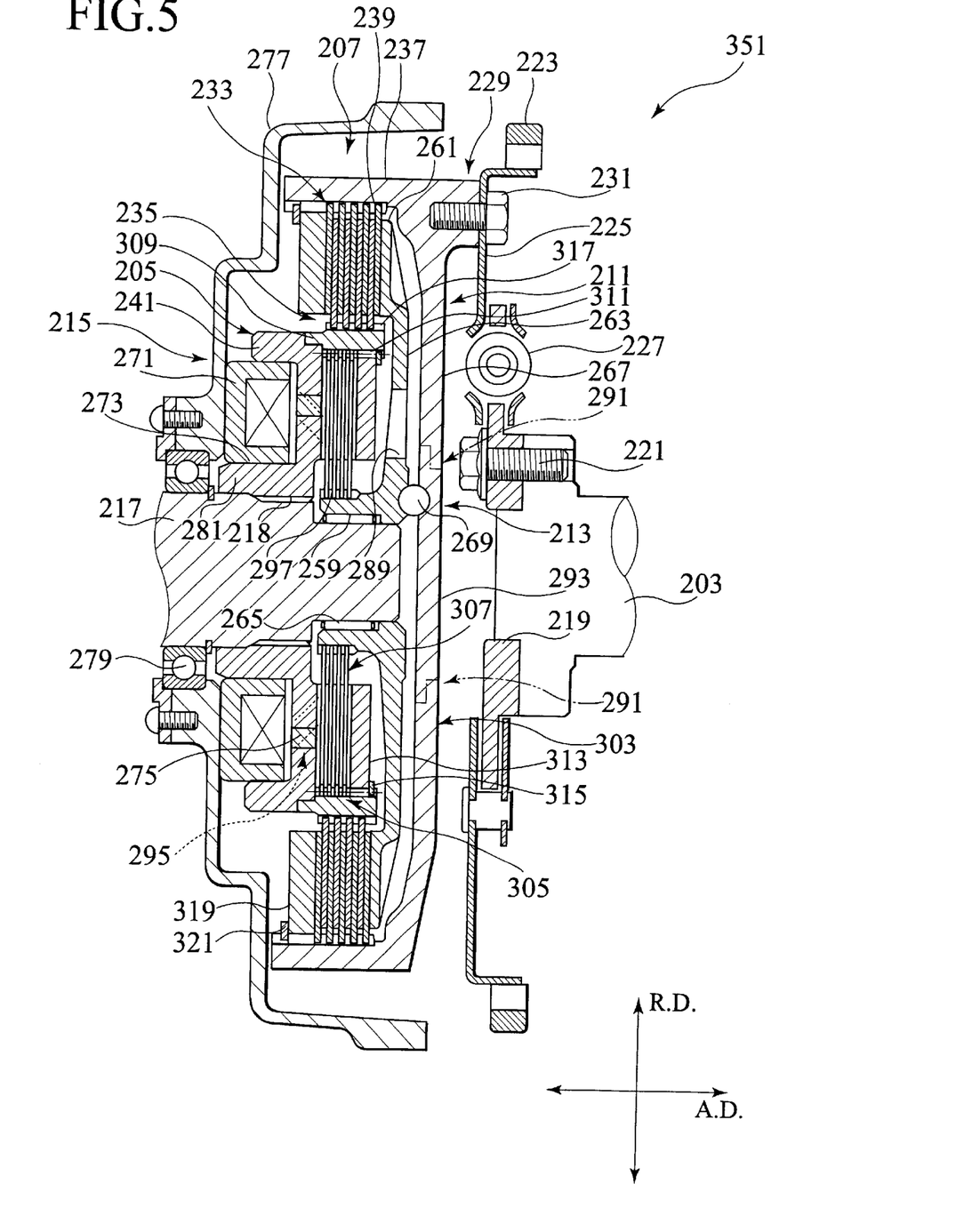
FIG. 5 is a sectional view of a fifth embodiment.

A description will be given of a fifth embodiment in accordance with the present invention with reference to FIG. 5. FIG. 5 is a cross sectional view showing a coupling 351 in accordance with the present embodiment.

The coupling 351 is structured such that the oil seal 325 is detached from the coupling 301 in accordance with the fourth embodiment thus to form the main clutch 207 and the pilot clutch 303 in a dry type, and a basic structure thereof is the same as that of the fourth embodiment mentioned above.

Accordingly, the coupling 351 in accordance with the present embodiment can obtain the same benefits as those of the coupling 301 except the benefits obtained by the matter that the coupling 301 in accordance with the fourth embodiment is a wet type.

In this case, the coupling 301 and the coupling 351 in accordance with the fourth and fifth embodiments may be structured such that a surface treatment is applied only to the inner member 293 formed with the cam groove of the ball cam 213 in the same manner as that of the coupling 201.

Further, the structure may be made such that the ring for preventing a magnetic short circuit of the rotor 205 is formed in a shape as shown by the arrow 295 or the elongated hole in the rotational direction and the connecting part are alternately provided in the rotor 205.

In this case, in accordance with the present invention, any type of clutch may be employed for the main clutch and the pilot clutch, as far as it is a friction clutch, for example, a multi disc clutch, a single disc, a cone clutch or the like.

Further, these clutches may be a wet type or a dry type.

Further, the clutch disc of the multi disc clutch and the single disc clutch may employ any of a steel, a carbon, a paper and the like.

Further, the torque transmission member in accordance with claims 14 and 15 is not limited to the member integrally formed. For example, it may employ a member structured such that a plurality of members is integrated for rotation by welding, pressure inserting, bonding or the like, a member structured such that a plurality of members are connected in a rotational direction by an engagement connecting part such as a spline so as to integrally rotate, or a member structured such as to combine an axial positioning by means of a snap ring, an opposite contact with the other member or the like and the connection in the rotational direction mentioned above so as to integrally rotate a plurality of member.

Further, the structure in accordance with claim 14 corresponds to the structure obtained by forming two cylinder parts in the same torque transmission member, connecting the main clutch to one cylinder part and connecting the pilot clutch to the other cylinder part. In comparison with the structure obtained by connecting these elements to the different torque transmission members, the number of the constituting members can be reduced and the coupling can be made more compact and lighter.

What is claimed is:

1. A coupling comprising:

a first rotary member rotatable about an axis;

a second rotary member rotatable relative to the first rotary member;

a first clutch for interconnecting the first rotary member and the second rotary member, the first clutch including a first clutch member rotatable together with the first rotary member and a second clutch member rotatable together with the second rotary member, the first and second clutch members to be axially displaced to engage with each other; and a displacing mechanism for providing a relative displacement between the first and second clutch members, the displacing mechanism comprising:

a cam mechanism comprising:

a first cam side to be rotated together with the first rotary member;

a second cam side connectable with the second rotary member to rotate relative to the first cam side; and a cam member rotatably interposed between the first and second cam sides, the first and second cam sides and the cam member cooperating to axially displace the second cam side away from the first cam side, as the cam member is rotated, thereby providing the first and second clutch members with a relative displacement by the second cam side; and a second clutch disposed in a radial position relative to the first clutch for interlocking the second rotary member and the second cam side.

2. A coupling as set forth in claim 1, wherein the first clutch is disposed radially outward of the second clutch.

3. A coupling as set forth in claim 1, wherein the second clutch is configured to be magnetically operated.

4. A coupling as set forth in claim 3, wherein the displacing mechanism comprises an electromagnet disposed axially adjacent to the second clutch.

5. A coupling as set forth in claim 1, wherein the cam mechanism multiplies and converts torque into thrust force, and the torque is exerted on the cam member by the second cam side when the second clutch is engaged.

6. A coupling as set forth in claim 1, wherein the cam mechanism and the first clutch are at an identical axial position.

7. A coupling as set forth in claim 1, wherein the cam mechanism and the second clutch are at an identical axial position.

8. A coupling as set forth in claim 1, wherein the cam mechanism is disposed radially inward of the first clutch and the second clutch.

9. A coupling as set forth in claim 1, wherein the displacing mechanism comprises an operating member for transmitting thrust force multiplied by the cam mechanism to the first clutch, and the operating member comprises:

a base part; and an operating part formed at an outer end of the base part, the operating part facing axially the first clutch, the base part interconnecting the cam mechanism and the operating part over the second clutch.

10. A coupling as set forth in claim 1, wherein the displacing member comprises an operating member for transmitting thrust force multiplied by the cam mechanism to the first clutch, wherein the cam mechanism is provided between the operating member and the first rotary member.

11. A coupling as set forth in claim 1, wherein the cam mechanism includes a multiplying function.

12. A coupling as set forth in claim 1, further comprising:

wherein the first and second rotary member comprises a torque transmission member connected with the first clutch and the second clutch, the torque transmission member including first and second cylinder parts, the first cylinder part being connected with the first clutch, the second cylinder part being connected with the second clutch.

13. A coupling as set forth in claim 1, wherein the first and second rotary member comprises a torque transmission member connected with the first clutch and the second clutch, the torque transmission member including a cylinder part with a first and second side opposite to each other, the first clutch being connected to the first side, the second clutch being connected to the second side.

14. A coupling as set forth in claim 1, wherein the second clutch includes a cone clutch.

15. A coupling as set forth in claim 1, wherein the first clutch and the second clutch are disposed at differently radial positions and at an identical axial position.

16. A coupling as set forth in claim 1, wherein the displacing mechanism comprises an operation member interconnecting the second cam side and the second clutch, the operation member being configured to be rotated and axially displaced together with the second cam side to press against the first and second clutch members.

17. A coupling as set forth in claim 16, wherein the operation member includes the second cam side, and the first rotary member includes the first cam side.

18. A coupling comprising:
   a first rotary member rotatable about an axis;
   a second rotary member rotatable relative to the first rotary member;
   a first clutch for interconnecting the first rotary member and the second rotary member, the first clutch including a first clutch member rotatable together with the first rotary member and the second clutch member rotatable together with the second rotary member, the first and second clutch members to be axially displaced to engage with each other; and
   a displacing mechanism for providing a relative displacement between the first and second clutch members,
   the displacing mechanism comprising:
   a cam mechanism comprising:
      a first cam side to be rotated together with the first rotary member;
      a second cam side connectable with the second rotary member to rotate relative to the first cam side; and
      a cam member rotatably interposed between the first and second cam sides,
      the first and second cam sides and the cam member cooperating to axially displace the first cam side away from the second cam side, as the cam member is rotated;
   a second clutch disposed in a radial position relative to the first clutch for interlocking the second rotary member and the second cam side; and
   a lever member supported to the first rotary member for pivoting on a fulcrum, the lever member being interlocked with the first cam side thereby to provide the first and second clutch members with a relative displacement.

19. A coupling as set forth in claim 18, wherein the lever member comprises a diaphragm spring fixed to an end thereof for operating the first clutch.

20. A coupling as set forth in claim 18, wherein the first clutch is engaged when the second clutch is disengaged.

* * * * *